United States Patent
Yifrach et al.

(10) Patent No.: US 7,562,168 B1
(45) Date of Patent: Jul. 14, 2009

(54) METHOD OF OPTIMIZING BUFFER USAGE OF VIRTUAL CHANNELS OF A PHYSICAL COMMUNICATION LINK AND APPARATUSES FOR PERFORMING THE SAME

(75) Inventors: Shaul Yifrach, Haifa (IL); Ilya Gransovky, Haifa (IL); Etai Adar, Yokneam Ilit (IL); Giora Biran, Zichron-Yaakov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/128,872

(22) Filed: May 29, 2008

(51) Int. Cl.
  *G06F 3/00* (2006.01)
  *H04J 3/16* (2006.01)
(52) U.S. Cl. ......................... 710/52; 370/468
(58) Field of Classification Search ............... 370/222, 370/229, 230, 234, 236, 389, 395, 397; 710/29, 710/310
See application file for complete search history.

(56) References Cited

U.S. PATENT DOCUMENTS

| | | | |
|---|---|---|---|
| 5,499,367 A | 3/1996 | Bamford et al. | |
| 5,729,742 A | 3/1998 | Harbinski et al. | |
| 5,838,994 A | 11/1998 | Valizadeh | |
| 6,519,595 B1 | 2/2003 | Rose | |
| 6,535,512 B1 | 3/2003 | Daniel et al. | |
| 6,615,271 B1 | 9/2003 | Lauck et al. | |
| 6,715,055 B1 | 3/2004 | Hughes | |
| 6,717,912 B1 | 4/2004 | Lemyre et al. | |
| 6,938,094 B1 | 8/2005 | Keller et al. | |
| 6,938,143 B2 | 8/2005 | Le | |
| 6,944,173 B1 * | 9/2005 | Jones et al. | 370/413 |
| 7,203,802 B2 | 4/2007 | Huras et al. | |
| 7,219,127 B2 | 5/2007 | Huck et al. | |
| 7,301,898 B1 * | 11/2007 | Martin et al. | 370/229 |
| 2002/0031129 A1 | 3/2002 | Finn et al. | |
| 2003/0009477 A1 | 1/2003 | Wilding et al. | |
| 2003/0048798 A1 | 3/2003 | Scott et al. | |
| 2003/0189935 A1 | 10/2003 | Warden et al. | |
| 2004/0019714 A1 | 1/2004 | Kelley et al. | |
| 2004/0085984 A1 | 5/2004 | Elzur | |
| 2004/0160970 A1 | 8/2004 | Dally et al. | |
| 2005/0249128 A1 | 11/2005 | Mekkittikul et al. | |
| 2005/0254519 A1 * | 11/2005 | Beukema et al. | 370/468 |
| 2006/0056292 A1 * | 3/2006 | Mayhew et al. | 370/229 |
| 2007/0121495 A1 * | 5/2007 | Breti et al. | 370/229 |
| 2007/0260782 A1 | 11/2007 | Shaikli | |
| 2008/0117931 A1 * | 5/2008 | Beukema et al. | 370/468 |

OTHER PUBLICATIONS

Reuter, Andreas, "Performance Analysis of Recovery Techniques," University of Kaiserslautern, ACM Transactions on Database Systems, vol. 9, No. 4, Dec. 1984, pp. 526-559.

* cited by examiner

*Primary Examiner*—Henry W. H. Tsai
*Assistant Examiner*—Cheng-Yuan Tseng
(74) *Attorney, Agent, or Firm*—Wenderoth, Lind & Ponack, L.L.P.

(57) ABSTRACT

Optimization of a use of memory buffers of a device connected to a physical link including virtual channels (VCs) while sustaining bandwidth for communication between the device and another entity, by determining an initial allocation of memory buffers of each VC. Further, the optimization is accomplished by determining whether a next VC is active or inactive. If the VC is determined to be inactive, a number of memory buffers initially allocated to the inactive channel is determined, and the memory buffers are re-allocated between the active VCs.

1 Claim, 2 Drawing Sheets

METHOD OF OPTIMIZING BUFFER USAGE OF VIRTUAL CHANNELS OF A PHYSICAL COMMUNICATION LINK AND APPARATUSES FOR PERFORMING THE SAME

BACKGROUND OF THE INVENTION

1. Field of the Invention

The present invention relates to optimizing the use of memory buffers of a device which communicates via a physical communication link. More specifically, the present invention relates to a method of optimizing the use of memory buffers of the device which communicates via a physical communication link including a plurality of virtual channels while maintaining a sustained bandwidth for communication between the device and another entity.

2. Description of the Related Art

When communication is established on a physical communication link using a communication protocol such as PCI Express (PCIe), the physical communication link may be divided into multiple virtual channels. These virtual channels transmit information between a device and another entity via the physical communication link.

The device which transmits/receives information, via the multiple virtual channels, must assign certain portions of its memory to each virtual channel. These portions of memory are typically identified as memory buffers that are allocated to the virtual channels.

In order to ensure that a certain communication bandwidth can be sustained on the physical communication link, it is necessary for a sufficient number of memory buffers to be assigned (i.e., made available) to each virtual channel.

Quite often, not every virtual channel of the physical communication link is utilized. However, although each virtual channel is not utilized (i.e., active), each virtual channel (including active and inactive virtual channels) continues to have a certain number of memory buffers allocated thereto. This results in a loss of effective bandwidth of the physical communication link.

More specifically, this problem arises because memory buffers are assigned to the virtual channels of the physical communication link before the device which transmits/receives information realizes how many virtual channels are actually active. Thus, memory buffers are inevitably assigned to virtual channels that are inactive. In addition, once the memory buffers are assigned to the inactive virtual channels the memory buffers can not be redistributed. This practice of allocating memory buffers to inactive virtual channels is an inefficient use of the memory buffers of the device because use of the bandwidth of the physical communication link could be more efficient if memory buffers were only utilized by virtual channels that are "active" (e.g., the physical communication link could be more efficient if active virtual channels were allowed to use the memory buffers originally allocated to the inactive virtual channel(s)).

In order to address the above-mentioned problem, a method of optimization, to be executed during the normal use of a physical communication link for conducting communication between a device and another entity, is described below.

SUMMARY OF THE INVENTION

In view of the above-mentioned problems, an embodiment of this invention provides a method of optimizing a use of memory buffers of a device having a physical communication link including a plurality of virtual channels while maintaining a sustained bandwidth for communication between the device and another entity via the physical communication link, wherein each virtual channel of the physical communication link requires an initial allocation of memory buffers of the device.

An embodiment of this invention may include determining an initial allocation of memory buffers for each virtual channel of the physical communication link, establishing a first active virtual channel as a base virtual channel, advertising a number of memory buffers allocated to the base virtual channel, and checking a next virtual channel of the plurality of virtual channels to determine whether the next virtual channel is an active virtual channel or an inactive virtual channel.

Further, according to an embodiment of this invention, if the next virtual channel is determined to be an active virtual channel, then continuing to check additional virtual channels of the plurality of virtual channels until a current virtual channel is determined to be an inactive virtual channel.

Moreover, according to an embodiment of this invention, upon a determination that a current virtual channel is an inactive virtual channel: determining a number of memory buffers initially allocated to the current inactive virtual channel; advertising the number of memory buffers initially allocated to the current inactive virtual channel; and donating memory buffers to each virtual channel identified as being active by re-allocating the memory buffers initially allocated to the current inactive virtual channel between the virtual channel(s) identified as being active.

An embodiment of this invention may include terminating the optimization once the checking of the next virtual channel has checked every virtual channel of the physical communication link.

Furthermore, additional embodiments of the present invention can be directed to a system including the physical communication link, the device, and the other entity. In addition, other embodiments of the present invention can be directed to an apparatus, such as the device. In addition, the present invention can also be implemented as a program causing a computer to execute the above-described steps. The program can be distributed via a computer-readable storage medium such as a CD-ROM.

Additional features and advantages are described herein, and will be apparent from, the following Detailed Description and the figures.

DETAILED DESCRIPTION OF THE INVENTION

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention.

Figure 1:
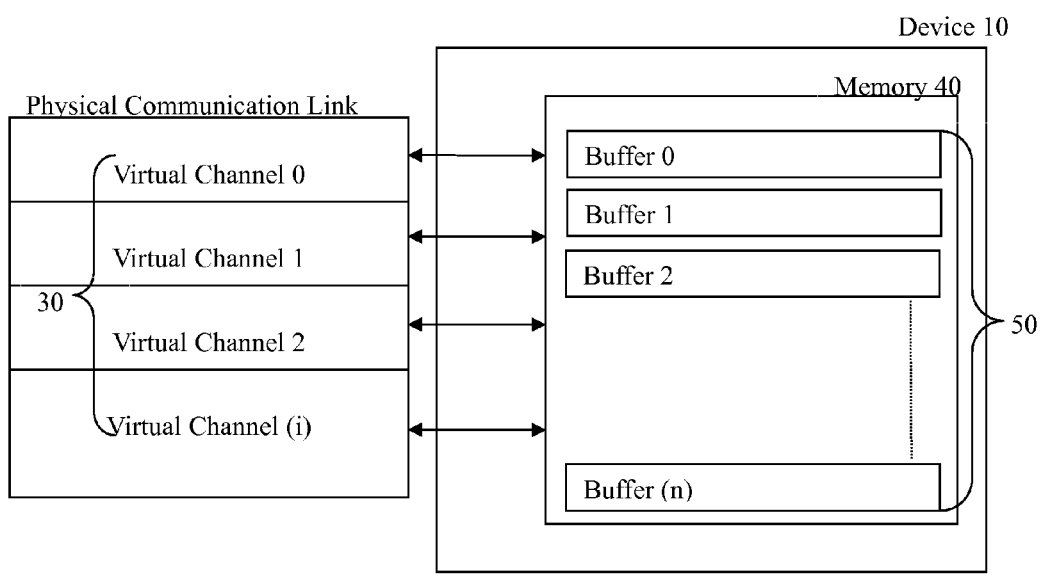
FIG. 1 illustrates an example of the physical relationship between the device 10 and the physical communication link 20.
Figure 2:
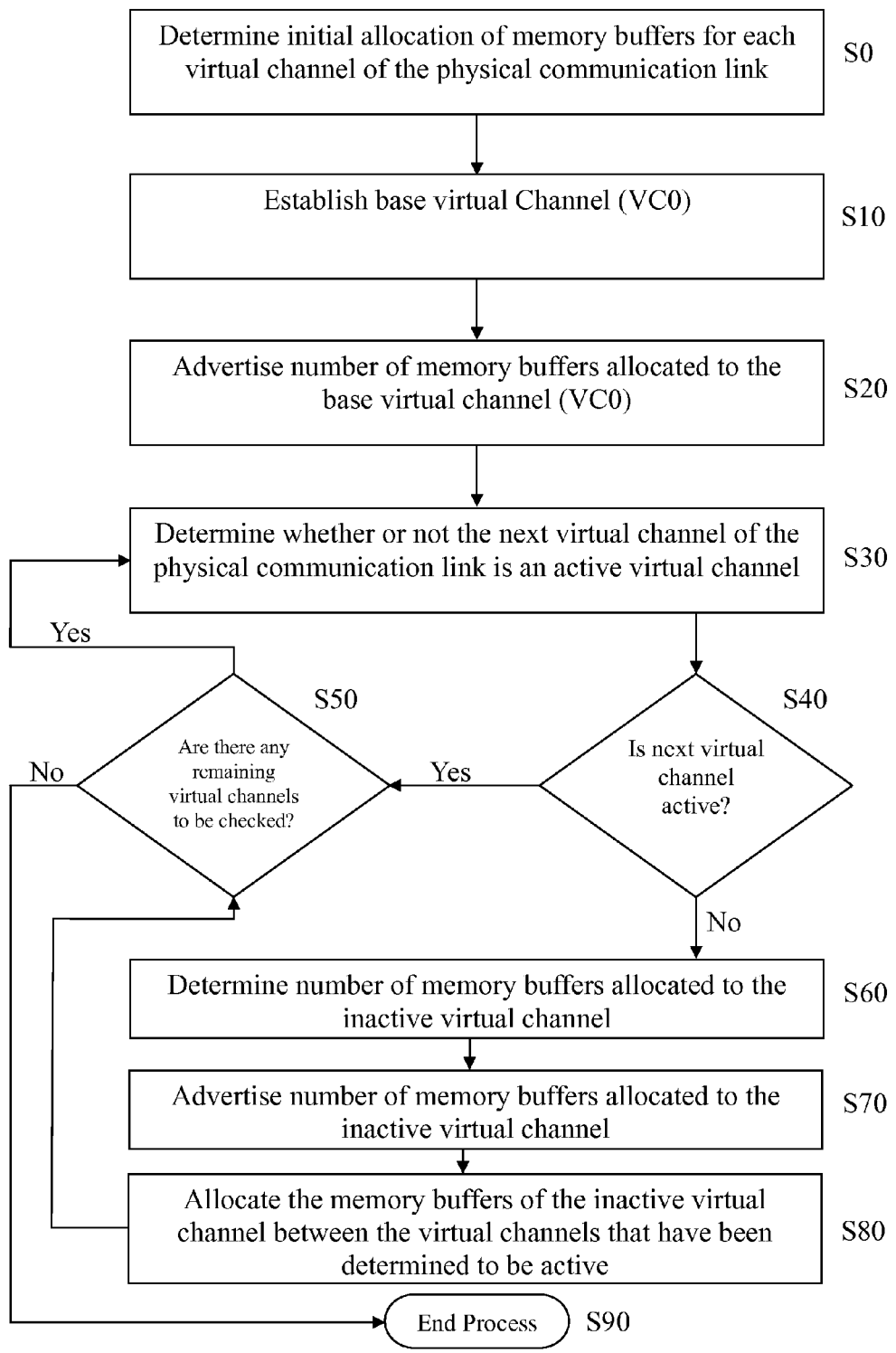
FIG. 2 is a flow chart illustrating features of an optimization method included in an embodiment of the invention.

As illustrated in FIGS. 1 and 2, an embodiment of this invention includes optimizing the use of memory buffers 50 (e.g., buffer 0 through buffer (n)) of a device 10 having a physical communication link 20 including a plurality of virtual channels 30. This optimization maintains a sustained bandwidth for communication between the device 10 and another entity (not shown) on the physical communication link 20. This type of communication typically requires each virtual channel 30 of the physical communication link 20 to have a specific allocation of memory buffers 50.

This optimization may include determining an initial allocation of memory buffers 50 (e.g., any of memory buffer 0 through memory buffer (n)) for each virtual channel 30 of the physical communication link 20 (S0). After the initial allocation of memory buffers 50 is completed, this optimization may include establishing a first active virtual channel as a base virtual channel (e.g., VC0) (S10). The number of memory buffers 50 allocated to the base virtual channel (VC0) can be advertised, for example, to the device 10 and/or the remaining virtual channels 30 (S20).

Next, the optimization may check a next virtual channel (e.g., VC1) to determine whether the next virtual channel (e.g., VC1) is an active virtual channel or an inactive virtual channel (S30 and S40).

If the next virtual channel (e.g., VC1) is determined to be an active virtual channel, then additional virtual channels (e.g., VC2 through VC(i)) must be checked until a current virtual channel (e.g., VC2) is determined to be an inactive virtual channel (S50 and S30).

If an inactive virtual channel is found in step S40, then a number of memory buffers 50 initially allocated to the current inactive virtual channel (e.g., VC2) is determined (S60). The memory buffers 50 allocated to the current inactive virtual channel can be identified as inactive memory buffers. The number of inactive memory buffers initially allocated to the current inactive channel (e.g., VC2) is advertised (S70). These inactive memory buffers initially allocated to the current inactive channel (e.g., VC2) are re-allocated among the virtual channel(s) determined to be active (S80).

For example, this re-allocation can be accomplished by allocating the inactive memory buffers initially allocated to the current inactive virtual channel (e.g., VC2) to each active virtual channel (e.g., VC0 and VC1).

Once all of the virtual channels 30 have been checked, the optimization process may terminate.

In addition, the optimization may terminate once each of the virtual channels of the physical communication link have been checked (S90).

Another aspect of the invention includes buffer redistribution using "fake" credit updates. Credit updates are typically used to indicate that a memory buffer can be used to store information. For example, after a virtual channel (e.g., VC2) is deemed inactive, the inactive memory buffers are advertised as being available for each active virtual channel (e.g., VC0 and VC1) by creating "fake" credit updates. These "fake" credit updates may indicate that an extra memory buffer is available without actually sending any data packets from the device that transmits information, which in turn provides an efficient method of buffer redistribution.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claim.

The invention claimed is:

1. A method of optimizing a use of memory buffers of a device connected to a physical communication link including a plurality of virtual channels while maintaining a sustained bandwidth for communication between the device and another entity via the physical communication link, each virtual channel of the physical communication link requiring an initial allocation of the memory buffers of the device, the method comprising:

determining an initial allocation of memory buffers for each virtual channel of the physical communication link;

establishing a first active virtual channel as a base virtual channel;

advertising a number of memory buffers allocated to only the base virtual channel;

checking a next virtual channel of the plurality of virtual channels to determine whether or not the next virtual channel is an active virtual channel or an inactive virtual channel; and when the next virtual channel is determined to be an active virtual channel, identifying the next virtual channel as an active virtual channel and continuing to check additional virtual channels of the plurality of virtual channels until a current virtual channel is determined to be an inactive virtual channel, wherein, when the current virtual channel is determined to be an inactive virtual channel:

determining a number of memory buffers initially allocated to the current inactive virtual channel;

advertising the number of memory buffers initially allocated to the current inactive virtual channel; and re-allocating the memory buffers initially allocated to the current inactive virtual channel between every virtual channel identified as an active virtual channel, and wherein, once the checking of the next virtual channel checks every virtual channel of the plurality of virtual channels, terminating the method of optimizing the use of the memory buffers.

* * * * *